P. N. JONES & J. W. WELSH.
CONTROL OF ELECTRIC MOTORS AND APPARATUS THEREFOR.
APPLICATION FILED NOV. 12, 1913.
1,109,338.
Patented Sept. 1, 1914.
5 SHEETS—SHEET 4.
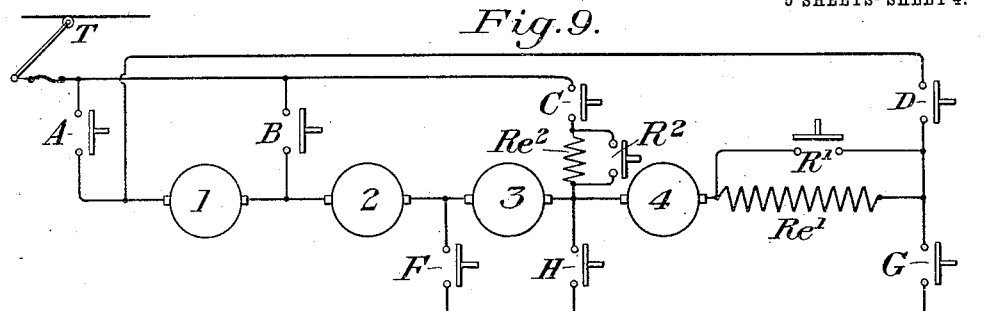
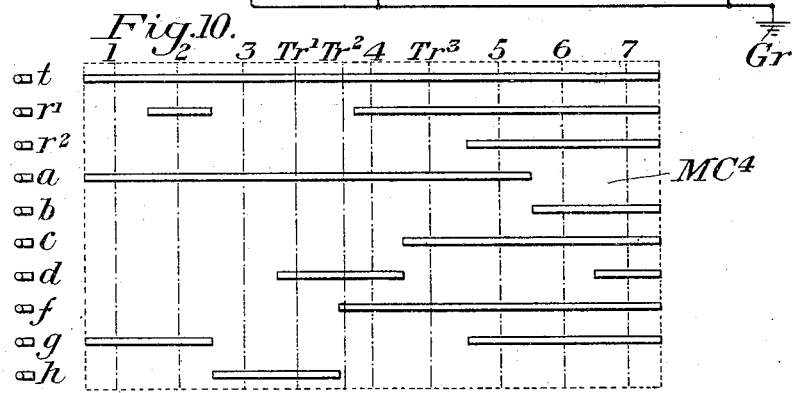
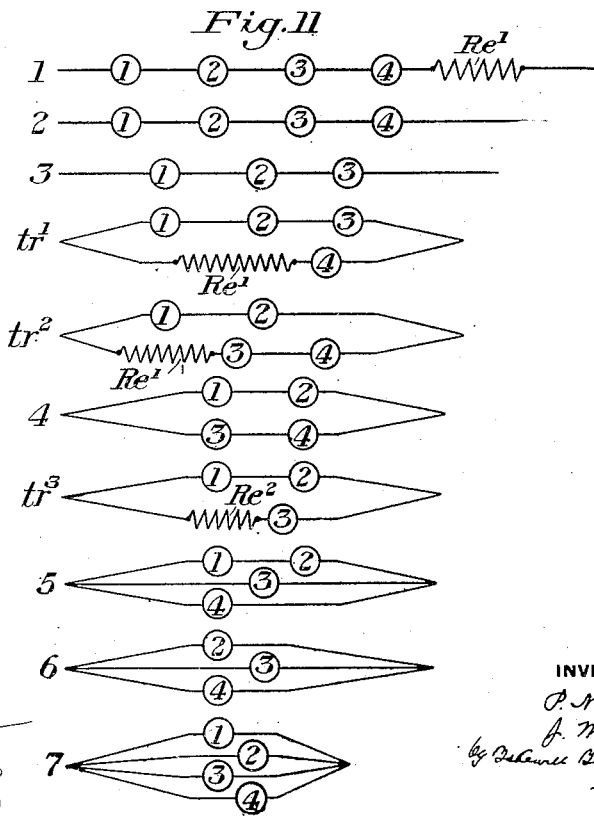
WITNESSES
INVENTORS P. N. JONES & J. W. WELSH.
CONTROL OF ELECTRIC MOTORS AND APPARATUS THEREFOR.
APPLICATION FILED NOV. 12, 1913.
1,109,338.
Patented Sept. 1, 1914.
5 SHEETS—SHEET 5.
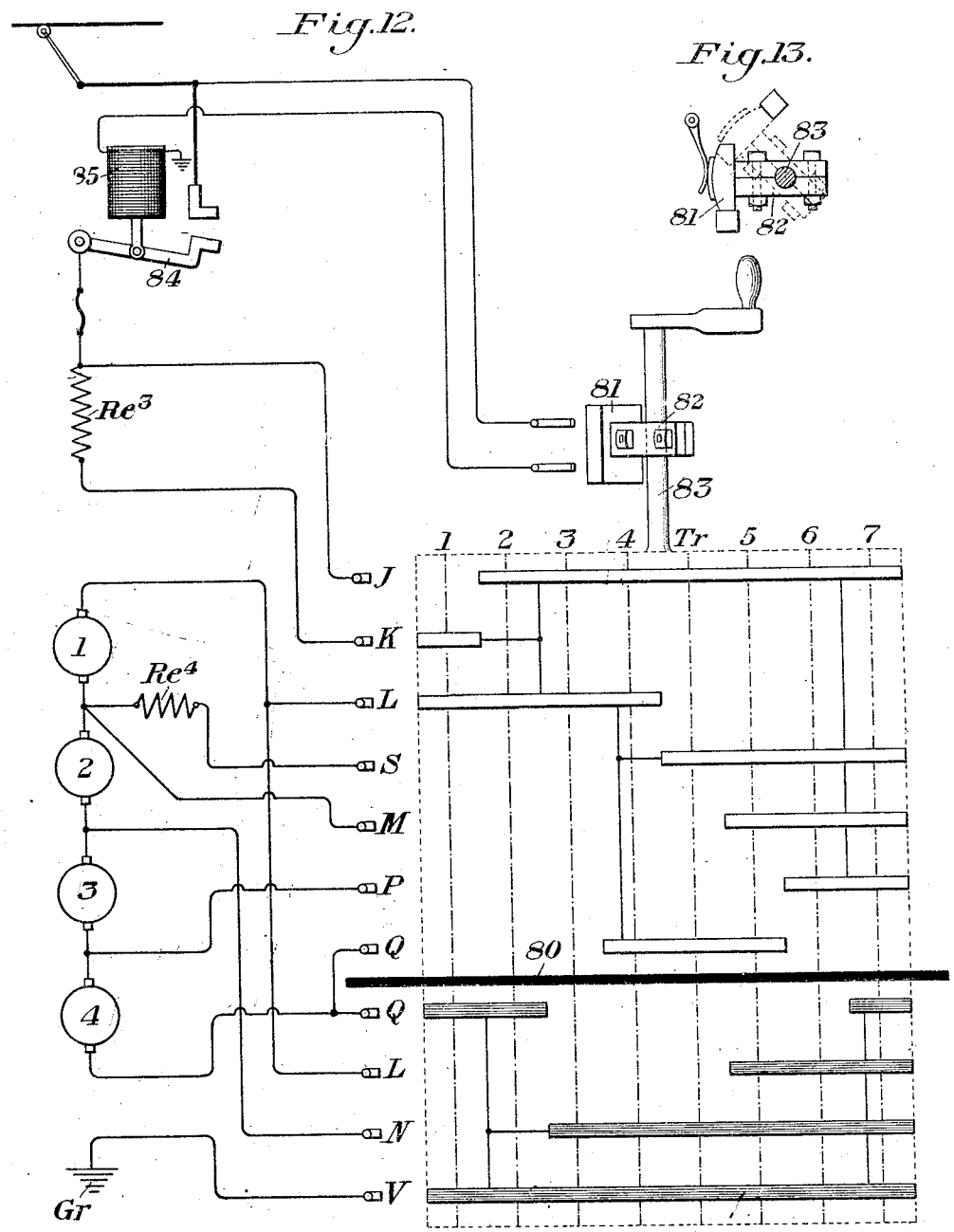

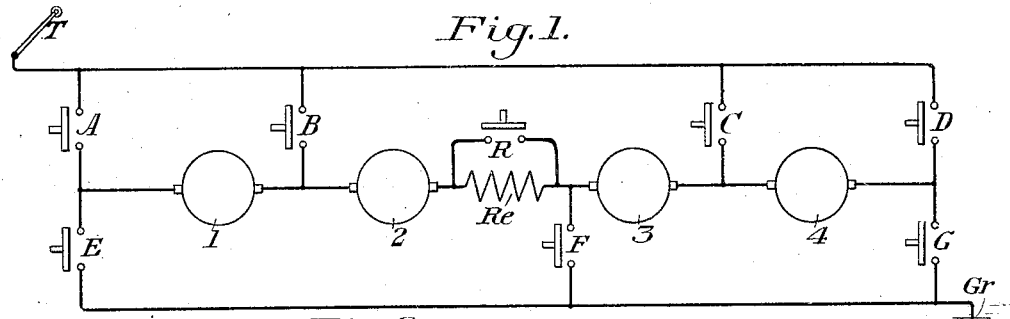
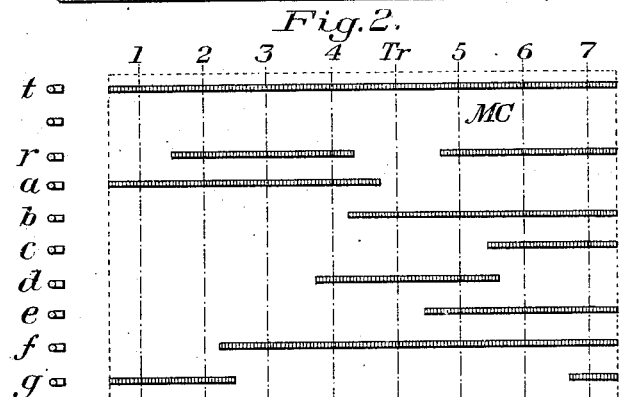
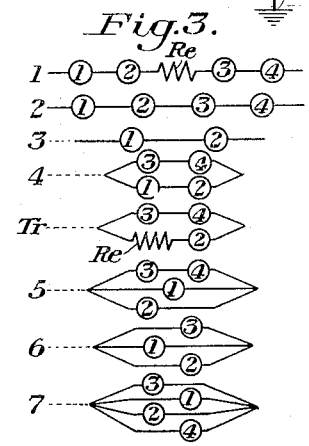
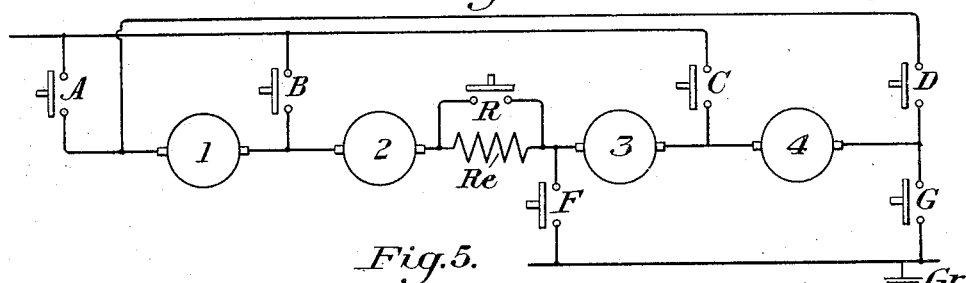
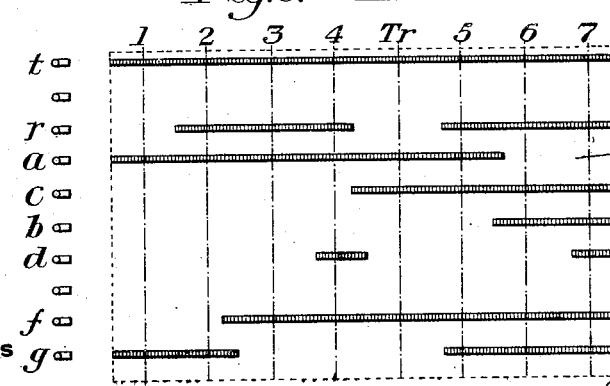

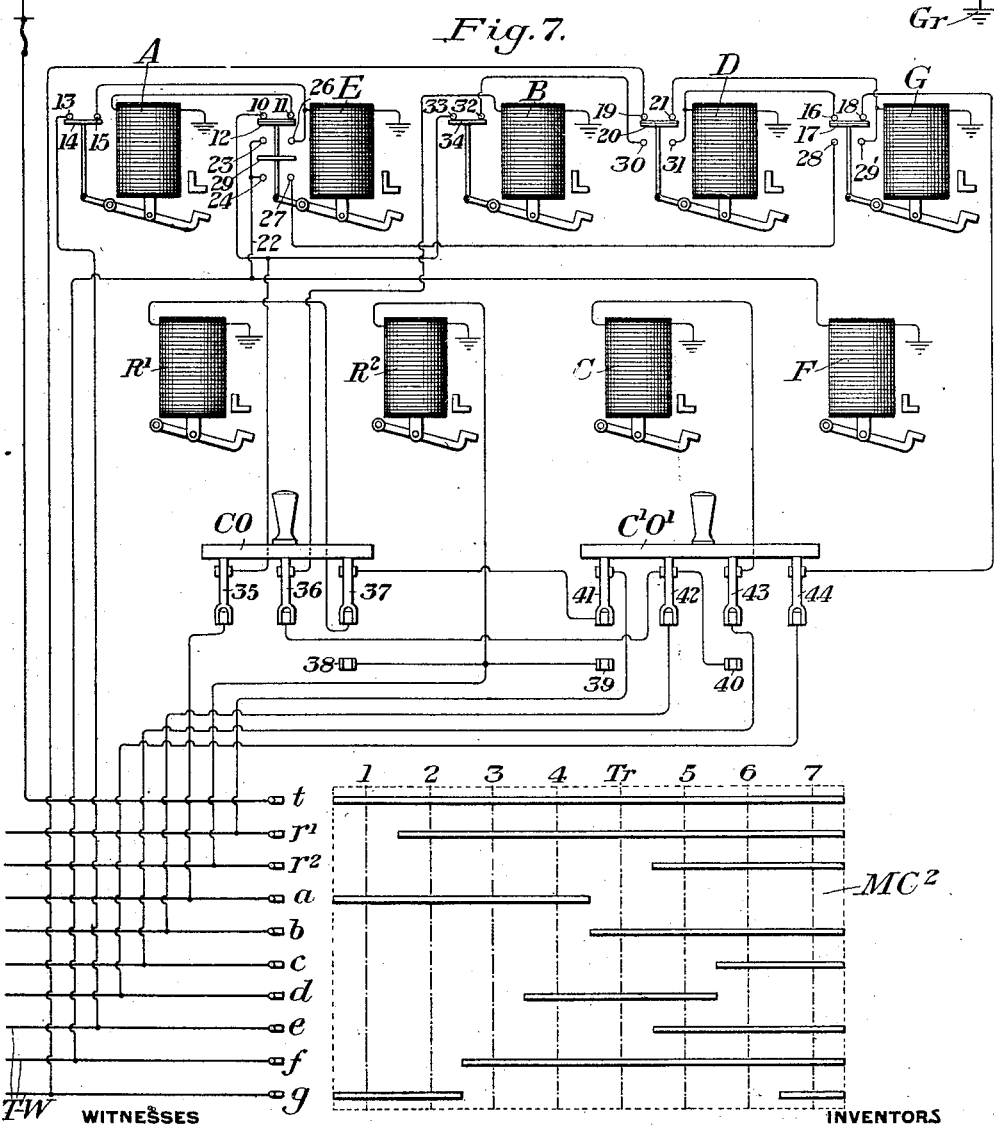

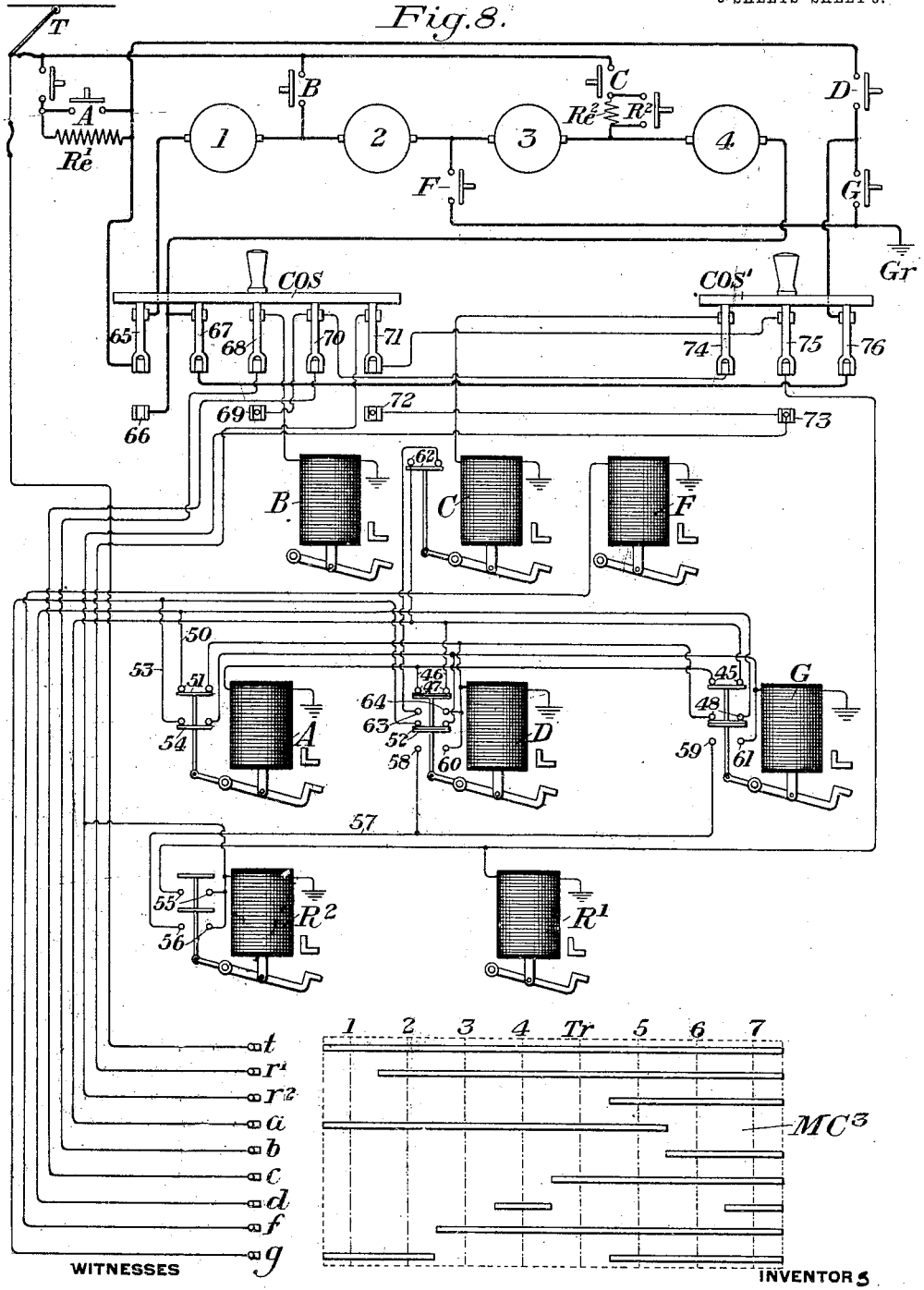

UNITED STATES PATENT OFFICE.

PEARL N. JONES AND JAMES W. WELSH, OF PITTSBURGH, PENNSYLVANIA.

CONTROL OF ELECTRIC MOTORS AND APPARATUS THEREFOR.

1,109,338.

Specification of Letters Patent. Patented Sept. 1, 1914.

Application filed November 12, 1913. Serial No. 800,502.

*To all whom it may concern:*

Be it known that we, PEARL N. JONES and JAMES W. WELSH, both residents of Pittsburgh, county of Allegheny, and State of Pennsylvania, have invented a new and useful Improvement in the Control of Electric Motors and Apparatus Therefor, of which the following is a full, clear, and exact description, reference being had to the accompanying drawings, forming part of this specification, in which—

Figure 1 is a wiring diagram of the power circuits as arranged for carrying out one form of our improved method of control; Fig. 2 is a development of the master controller which may be employed for controlling the operation of the contactors of Fig. 1; Fig. 3 is a diagram illustrating the motor connections and relations in different positions of the master controller; Fig. 4 is a view similar to Fig. 1, but illustrating a modification; Fig. 5 is a view similar to Fig. 2, but showing a master controller for use in connection with the control method illustrated by Fig. 4; Fig. 6 is a view, similar to Fig. 1, but showing another modification; Fig. 7 is a wiring diagram of the master controller and control circuits employed in connection with the arrangement shown in Fig. 6; Fig. 8 is a wiring diagram showing another modification, and showing the relation between the power and control circuits; Fig. 9 is a view similar to Fig. 1, but showing another modification; Fig. 10 is a view similar to Fig. 2 and showing a master controller adapted for use in connection with the circuit arrangement of Fig. 9; Fig. 11 is a view similar to Fig. 3, but showing the motor connections and relations which result from the arrangements of Figs. 9 and 10; Fig. 12 is a wiring diagram showing a form of our invention in which, instead of a master controller and a plurality of contactors controlled thereby, the motors are connected directly to and controlled by the contacts of a drum controller; and Fig. 13 is a detail view of the circuit opening switch shown in Fig. 12.

Our invention has relation to the control of series wound electric motors, and more particularly for use in connection with the driving motors of electrically propelled vehicles. The invention is more particularly adapted to the control of four electric motors, although some of its features are not specifically limited to such use.

Some of the more important objects of our invention are as follows:

First. To provide an improved method for changing the motors from series-parallel position to full-parallel position. Our invention provides a series of steps whereby this change can be effected in a gradual and easy manner, no less than three of the motors being actively in circuit at all times during this change.

Second. To provide a method of changing the motors from series position to full-parallel position by a series of gradual and easy transitions in which no less than three motors are actively in circuit at all times.

Third. To effect the change from series, or from series-parallel position, to full-parallel position with the use of a minimum amount of external resistance. Our method provides means whereby very little external resistance is required and whereby in each case a resistance may be employed which is suitable for the particular condition then existing.

Fourth. To provide means of novel and effective character for reducing the arcing at the switch contacts.

Fifth. To provide for an interlocking action between some of the contactors whereby establishing of short circuit between the trolley and ground is prevented, and whereby the fourth object above stated may be accomplished.

Sixth. To provide a control system or method in which either pair of motors may be cut out of circuit either wholly without opening the power circuits, or by opening said circuits to a minimum extent.

Seventh. To provide apparatus of simple and effective character for carrying out the previously stated objects.

The nature of our invention will be best understood by reference to the accompanying drawings in which we have shown a number of different modifications thereof and which will now be described, it being premised, however, that the invention is susceptible of various other modifications within the scope of the appended claims.

Referring first to that form of our invention illustrated in Figs. 1, 2 and 3, the numerals 1, 2, 3 and 4 designate four electric motors. A, B, C, D, E, F and G designate the contactors or switch devices by means of which the power circuits of the motors are controlled. The movable elements of these contactors may be actuated in any suitable manner. In the forms of our invention illustrated herein, they are actuated by means of solenoid coils whose circuits are controlled by a master controller. R designates another contactor which is for the purpose of controlling the external resistance Re. T indicates the trolley connection and Gr indicates a ground connection.

The different positions of the master controller MC are indicated by the dotted vertical lines in Fig. 2, and the corresponding motor connections and relations are indicated diagrammatically in Fig. 3. For convenience, the relatively fixed contacts of the master controller are given lower case reference letters which correspond to the various contactors which they control. In this manner the open or closed position of each contactor in any position of the master controller can be readily seen by a comparison of Figs. 1 and 2.

In the first position of the master controller, contactors A and G are closed, the other contactors being open. The four motors are therefore connected in series with each other and with the resistance Re in the manner illustrated in the first position of Fig. 3. At the second position of the master controller, the only change is the closing of contactor R to thereby short circuit the resistance Re. In the third position, contactors R, A and F are closed and the contactor G is opened. The closing of contactor F and the opening of contactor G cuts the number 3 and number 4 motors out of circuit and leaves motors numbers 1 and 2 in series with each other. In the fourth position of the master controller, contactors R, A, D and F are closed. This connects the four motors in two series-parallel connected groups or pairs, the direction of current flow through the motors 3 and 4 being reversed with respect to the direction of flow therethrough in positions 1 and 2 of the master controller. The next position of the master controller (marked tr) is a transition position. In this position, contactors B, D and F are closed. This short circuits motor number 1 and places number 2 in series with the resistance Re and said motor and resistance in series-parallel with the two motors 3 and 4.

In the fifth running position, contactors R, B, D, E and F are closed. In this position the motors 3 and 4 are connected in series with each other and the motors 1 and 2 are each connected across the line and in parallel with motors 3 and 4, which latter two are still in series.

In the sixth running position the only change which has occurred from position five is the closing of contactor C and the opening of contactor D. This short circuits motor number 4 and leaves motors numbers 1, 2 and 3 in parallel.

In the seventh running position the only change which occurs is the closing of contactor G thereby connecting motor number 4 in parallel with motors 1, 2 and 3.

It will be seen that in passing from the series-parallel condition of position number 4 to the full-parallel relation of position 7, three of the motors are at all times actively connected in circuit. In making this transition the only external resistance employed is that temporarily inserted in series with motor 2 at the transition position. This resistance is immediately cut out and motors 1 and 2 are each given full line voltage. Motors 3 and 4 are successively placed in parallel. It will further be noted that from the initial series position to the full-parallel position there has been maintained a constant series connection between the motors. This feature, however, while presenting certain advantages, is not essential to our present invention.

The modification illustrated by Figs. 4 and 5 effects the same motor combination and series of steps as illustrated by the preceding figures. The difference between the two forms consists solely in the apparatus employed. In the form shown in Figs. 4 and 5 the circuit connections are so arranged that the contactor E is omitted. This is made possible by connecting one of the contact points of the contactor D with the circuit wire leading to motor number 1 between said motor and the contactor A. This, of course, requires slight modifications in the master controller MC'. It will, however, be unnecessary to describe these in detail as they are clearly apparent from the diagram itself. In order to avoid confusion, the corresponding parts have been given the same reference characters as in Figs. 1, 2 and 3.

Fig. 6 shows the power circuits and Fig. 7 the control circuits of another form of our invention. Fig. 6 is similar to Fig. 1 in the general arrangement of circuits and contactors; but in this form we employ two external resistance coils Re' and Re² and provide an additional contactor R² for this resistance. The resistance Re' controlled by the contactor R' is shown as placed in series between the trolley and the power circuits; while the resistance R² is arranged to be connected into the power circuit between motors numbers 1 and 2. In order to avoid confusion we have again employed the same reference characters in Figs. 6 and 7 as in the preceding figures, to designate corresponding parts. The construction and arrangement shown in these figures effects the same general motor combinations as in the preceding figures, but instead of using the one resistance for both the series and transition positions, the resistance Re' is used in the series position, and the resistance Re², which is of a lower value, is used in the transition position.

In Fig. 7 we have illustrated not only the full control circuits, but also certain electrical interlocks which operate not only to prevent establishing a short circuit between trolley and ground, but also to maintain certain of the motor connections during the return movement of the master controller. By maintaining these connections during such return movement, the motors are held in closed local circuit which provides a closed path for the discharge of the electric energy of the motors and thus relieves the jaws of the contactor switches from breaking heavy arcs. This feature also decreases the number of operations of the switches on the return stroke.

The closed local circuit around the motors, it is true, contains the counter-electro motive forces of two motors which are opposing each other, but since in practice these are never exactly equal, one immediately overpowers the other, reversing its polarity and thus allowing the stored electrical energy of the motors to be rapidly dissipated within the local circuit.

The object of the holding in interlocks on the contactors is to maintain whatever arrangement of circuits exists at the instant of starting to throw the controller off until the off position is reached. In other words, whatever contactors are closed on any given notch from which the controller is thrown off, are held closed until the off position is reached.

By reference to Fig. 6, it will be apparent that if the contactors D and G should, by any possibility be closed at the same time, a direct short circuit would be established around the motors between trolley and ground. Such a short circuit would also be established if the contactors A and E should be closed at the same time. We therefore provide interlocking means whereby only one of the two switches of each of these sets can be closed at the same time. These interlocks are controlled by contacts operated by the contactors of certain of the power circuit switches. The coil or winding of each of the solenoids which operate the contactors are connected at one side to ground, as shown in Fig. 7. Their other terminals are connected either directly or indirectly, to those relatively fixed contacts of the master controller MC² which are given lower case letters corresponding to the upper case letters designating the respective contactors. The circuit connection leading from the contact $a$ to the solenoid of contactor A is connected to said coil through the fixed contacts 10 and 11 and movable contact 12 of the contactor E. The contact 12 is connected to the movable member or armature of the contactor E; and this contact closes the circuit between the contacts 10 and 11 only when the solenoid of the contactor E is deënergized. Therefore the circuit of the coil of contactor A cannot be closed as long as contactor E is closed. In a similar manner, the conductor leading from contact $e$ of the master controller is carried through the contacts 13, 14 and 15 of the contactor A, contact 14 closing the circuit between the contacts 13 and 15 only when contactor A is open. Therefore contactor E cannot be energized and operated so long as contactor A is energized and closed. In a similar manner the conductor leading from contact $d$ of the master controller to the coil of contactor D is carried through the contacts 16, 17 and 18 of contactor G; and the circuit of said coil cannot be closed when contactor G is energized and closed. The conductor leading from contactor $g$ of the master controller to the solenoid winding of contactor G is connected in a similar manner through the contacts 19, 20 and 21 of contactor D, whereby contactor G cannot be energized and closed so long as contactor D is energized and closed.

The holding closed of certain of the contactors during the return stroke of the master controller is accomplished as follows: The conductor leading from the contact $f$ of the master controller has a branch 22 which is connected to two contacts 23 and 24 of the contactor E. Opposite the contact 23 is a contact 26 which is connected to the coil of contactor E. When contactor E is closed its contact 12 bridges the two contacts 23 and 26, thus maintaining the coil of contactor E energized so long as contact fingers $f$ or $g$ are in engagement with their corresponding contacts on the drum of the master controller. Opposite the contact 24 is a contact 27 which is connected to a contact 28 of the contactor G. Contacts 24 and 27 are bridged by contact 29 of the contactor E when said contactor is energized. Opposite the contact 28 of contactor G is another contact 29'. The two contacts 28 and 29' are arranged to be bridged by the contact 17 of the contactor G when the coil of the latter is energized. Contact 29' is connected to the coil of contactor G. Therefore when this coil has been energized it is kept energized on the return stroke so long as the contact fingers $f$ or $g$ maintain their engagement with the corresponding contacts on the controller drum. The contactor D has two contacts 30 and 31 which are arranged to be bridged by the contact 20 when contactor D is closed. Contact 31 is connected to the coil of contactor D and contact 30 is connected to a contact 32 of the contactor B. Opposite the contact 32 is a contact 33 which is connected with the conductor leading from controller finger $a$. Contacts 32 and 33 are arranged to be bridged by a movable contact 34 actuated by contactor B, and only when contactor B is open.

By reference to Fig. 6, it will be seen that when the contactors E and G close the motors are connected in two closed local circuits, the connection through the contactor F acting as an equalizer. Therefore, by holding these contactors closed during the return stroke of the master controller to its off position the opening of contactors B, C and R′ and R² is effected while the motors are connected in these closed circuits. This protects the contactor jaws against the severe arcing usually caused by the "back-kick" from the motors when the switches are opened. By our improved method the energy of the motors is dissipated in these closed circuits. The contactors 30, 31, 32, 33 and 34 and their connections have a two-fold purpose. As just described, contactor G will be held closed clear to the off position of the controller during the return stroke, since as soon as contact finger $f$ leaves its segment on the drum of the controller, contact finger $g$ again engages its segment. The circuit for energizing contactor D comes through the back contacts of the contactor G; and normally the coil of contactor D can only be energized when contactor G is open. By the provision of contacts 30, 31, 32, 33 and 34, we provide means for energizing the coil of contactor D from the $a$ finger of the master controller. These contacts provide means for holding contactor D closed to the off position in the event that the forward movement of the master controller has not been carried beyond the fourth, or series-parallel position. This provides a closed local circuit around the motors through contactors A and D. By the provision of the interlocks above described we therefore not only greatly reduce the arcing at the contactor jaws, but we also eliminate, very largely, the tendency of arcs being formed between certain of the master controller contacts.

Fig. 7 also illustrates another feature of our invention referred to in the statement of objects, but not heretofore described. This is the arrangement of the cut-out switches for the motors in the control circuits in such a manner that either pair of motors may be cut out of circuit wholly by changes in the control circuits and without opening the power circuits at any point. This not only avoids the necessity for opening certain of the power circuits in cutting out either pair of motors, but it avoids the necessity for bringing any of the power circuit wires above the floor of the car. We accomplish this result by the arrangement of the cut-out switches now to be described: CO designates the cut-out switch for motors 1 and 2, and C′O′ the cut-out switch for motors 3 and 4. These cut-out switches are shown as of the manual double-throw type. Switch CO has three blades 35, 36 and 37. The blade 35 forms a part of the connection between the contact finger $a$ and the coil of contactor A. The blade 36 forms a part of the connection between the contact finger $b$ and the coil of contactor B. The blade 37 forms a part of the connection between the contact finger $r'$ and the coil of contactor R′. Fig. 7 shows the switches in the normal running positions. Switch CO has only one fixed contact 38 which it engages in its cut-out position. This contact 38 is connected with the conductor leading from the $r^2$ finger to the coil of the R² contactor. When the switch CO is thrown to its cut-out position, the circuits of the coils of contactors A and B are opened; and the normal circuit of the coil of contactor R′ is opened, but this coil is connected in circuit through the contact 38 with the $r^2$ finger. The purpose of this will be apparent by reference to the development of the master controller drum. If the coil contactor R′ were left connected to the $r'$ finger, the coil contactor R′ would be energized on the forward movement of the master controller between the first and second positions, and this resistance would be short circuited before a running position of motors 1 and 2 was reached. By the arrangement just described, resistance Re′ is kept in circuit until a short time before the fifth position is reached.

The sequence of operations with the cut-out switch thrown to its cutting out position is as follows: In the first position of the master controller the contactor G is closed, but as the contactors D and F are still open there is no circuit. This is likewise the condition in the second position. At the third position contact finger $f$ engages its corresponding segment on the drum and contactor F is closed and contactor G is opened. At the fourth position contactor D is energized, and the two motors are connected in series with the resistance Re′. This condition remains until the fifth position of the controller, when the resistance Re′ is short circuited by the closing of a contactor R′. In this position also contactor E is energized but no circuit change is effected. At the sixth position contactor C is closed, thus short circuiting motor number 4. At the seventh position contactor G is closed and contactor D is opened, thus placing motors 3 and 4 in parallel.

The cut-out switch C′O′ is a four-bladed double-throw switch having two effective contacts 39 and 40 when thrown to cut-out position. The four blades of the switch are designated as 41, 42, 43 and 44, respectively. The blade 41 forms a part of the connection between contact finger $r'$ and the coil of contactor R', this connection being carried in series through the blades 41 and 37 of the two cut-out switches. The blade 42 forms a part of the circuit between the $b$ finger and the coil of B contactor, this circuit connection being carried in series through the blades 42 and 36 of the two cut-out switches. The blade 43 forms a part of the connection between the contact finger $c$ and the coil of contact finger C. The blade 44 forms a part of the connection between the contact finger $d$ and the coil of contactor D. The contact 39 is connected to the conductor leading from the $r^2$ finger to the coil of contactor $R^2$. The contact 40 is cross connected to the upper fixed contact of the blade 42. When this cut-out switch C'O' is thrown to its cut-out position it opens the normal circuit of the coil of contactor R' and connects said coil, through the contact 39, with the finger $r^2$. It also opens the circuit of the C contactor, but through the contact 40 connects the coil of B contactor with $c$ contact finger. It also opens the circuit of the coil of contactor D. It is not believed to be necessary to trace out the sequence of operations with this cut-out switch thrown since the combinations of motors 1 and 2 effected thereby are similar to those effected of motors 3 and 4 when motors 1 and 2 are cut out. The circuits in the various positions of the master controller can be readily traced in Fig. 7.

It will be noted that the arrangement shown is well adapted to train control with a plurality of master controllers located on different cars, since the operation of the cut-out switches in no way affects the train line wires. As shown in Fig. 7, all the circuit connections leading to the coils of the several contactors consist of taps taken off the group of train wires TW.

In Fig. 8 we have shown a modified system which effects the same general motor combinations as that just described, but which differs therefrom mainly in the detail arrangement of the control circuits, their interlocks, and the arrangement of the cut-out switches. In this form the cut-out switches are not entirely independent of the power circuits; but the major portion of the operations of these switches is effected in the control circuits. This necessitates some change in the connections of the power circuits, in order to carry some of them through the cut-out switches. The difference in this respect between Figs. 6 and 8 will be best understood by a comparison of the two diagrams. It will be noted by such comparison that the main difference is the omission of contactor E. To avoid confusion, the motors, the various contactors, and the contact fingers of the master controller $MC^3$ are given the same reference characters as in the preceding figures, and new reference characters are only employed where there is some essential change in the construction or arrangement. In this figure it will be understood that the contactors indicated generally in the power circuits are the same contactors which are shown in detail in the control circuits. This plan has been followed in order to simplify the diagram and enable the figure to be more readily compared with Figs. 6 and 7.

One system of the interlocks shown in Fig. 8 is for the purpose of preventing short circuiting of the motors. It will be seen that if contactors A, D and G should by any reason be closed at the same time there would be a direct short circuit from trolley to ground. We therefore provide electrical interlocks which make it impossible for more than two of these three contactors to be closed or remain closed at the same time. That is to say, whereby contactor A cannot be closed unless either or both contactors D and G are open; whereby contactor D cannot be closed unless either or both A and G are open; and whereby contactor G cannot be closed unless either or both A and D contactors are open. This is accomplished as follows: The circuit wire leading from controller finger $a$ to the coil of contactor A is carried through a set of contacts 45 of the contactor G which are closed only when contactor G is open. Shunt connections 46 of this conductor also lead to contacts 47 of the contactor D, these contacts being closed only when contactor D is open. Therefore, the coil of contactor A cannot be energized unless either D or G, or both of them are open. In a like manner the circuit wire connecting finger $d$ with the coil of contactor D is carried through a second set of contacts 48 of contactor G and which are closed only when said contactor is open. A shunt 50 of said conductor also extends to a set of contacts 51 of contactor A and closed only when contactor A is open, therefore the coil of D cannot normally be energized unless either contactor A or contactor G, or both of them are open. Likewise, the conductor leading from the contact finger $g$ to the coil of contactor G is carried through a set of contacts 52 of the contactor D and which are closed only when contactor D is open; and a shunt connection 53 from said conductor is taken through a second set of contacts 54 of conductor A. Therefore the coil of contactor G cannot be energized unless contactor A or contactor D, or both of them are open.

The system of interlocks by which certain of the contactors are held closed during the return stroke of the master controller to off position, is as follows: For this purpose we provide the contactor R² with two sets of back contacts 55 and 56 which are closed only when contactor R² is closed. One of the fixed contacts of the set of contacts 55 is connected to the conductor leading from the finger r' to the coil of contactor R'. The other fixed contact of this set is connected to the coil of contactor R². One of the fixed contacts of the set of contacts 56 is also connected to the coil of R² and the other fixed contact is connected to a conductor 57 which has a branch leading to a contact point 58 of the contactor D and another branch leading to a contact point 59 of the contactor G. Opposite the contact point 58 is a contact 60 which is connected to the coil of contactor D. The two contacts 58 and 60 are arranged to be bridged by the movable contact of the set of contacts 52 when contactor D is closed. Opposite the contact 59 is a contact 61 which is connected to the coil of contactor G. Contacts 59 and 61 are arranged to be connected by the movable contact of the set of contacts 48 when contactor G is closed. By this system of interlocks it will be seen that on the return stroke of the controller drum, R² contactor will stay closed as long as r' finger is energized. The holding closed of contactor R² makes live contacts at 58 and 59, so that when these contactors close they will remain closed so long as r' finger engages its corresponding contact on the drum. When this finger opens on the return stroke (between the first and second positions) the g finger has been energized through its segment on the drum. This holds G contactor closed till the off position is reached; and by the current feeding back through the contacts 59 and 61 of the G contactor, contactors D, R' and R² will also be held closed until the off position is reached. It will be seen that these holding interlocks do not come into play until after the fourth notch on the forward movement of the controller when the contact finger r² engages its contact segment. We therefore provide an additional interlock which will operate to hold the D contactor closed during the return to off position should the drum be moved backwardly before the interlocks have become effective. This is accomplished by means of the set of contacts 62 on the back of contactor C and which are closed when contactor C is opened. One of the fixed contacts of this set is connected to the control wire leading from finger a to the coil of contactor A; and the other fixed contact 62 is connected to a contact 63 on the back of contactor D. Contact 63 is placed opposite a contact 64, connected to the coil of contactor D, and these two contacts are connected by the movable contact 47 when contactor D is closed. In this manner the D contactor will be held closed on the return stroke until off position is reached, although the forward movement of the controller drum may not have extended beyond its fourth position. Motors numbers 1 and 2 in this modification are cut out by means of a five-bladed double-throw cut-out switch COS, and motors numbers 3 and 4 are arranged to be cut out by a three-bladed double-throw cut-out COS'. The cut-out switch COS is connected in two of the power circuits and in three of the control circuits. The middle point of the first blade 65 of this switch is connected to trolley through the resistance Re', while the top contact of this blade is connected to the beginning of number 1 motor for normal operation. The fixed contact 66 is connected to the end of number 4 motor, so that when the switch is thrown to its cut-out position the number 3 and number 4 motors may be connected in series to trolley through the resistance Re'. The second blade 67 of this switch has its top contact connected with the conductor leading to the end of number 4 motor and its middle point is connected through one of the blades of the switch COS' to the power circuit at a point intermediate the contactors D and G.

The conductor leading from contact finger b to the coil of contactor B passes, normally, through the third blade 68 of the cut-out switch. The lower fixed contact 69 of this switch is connected through the upper contact of the fourth blade 70 and through the cut-out switch COS' with the coil of contactor C. The conductor leading from contact finger c to the coil of contactor C is normally carried through the fourth blade 70 of this switch. The upper contact of the fifth blade 71 is connected to contact finger r'. The middle point of this fifth blade is connected through the cut-out switch COS' with the coil of contactor R'. The lower fixed contact 72 is connected through a lower contact 73 of switch COS' with contact finger r². By reason of the cross connection to the contact 69, when the switch COS is thrown to cut-out position, the control wire to the B contactor is cut off and the b finger is connected to the coil of the C contactor. By reason of the lower fixed contact 72, when switch COS is moved to its cut-out position, the circuit of the r' finger is open and the coil of the R' contactor is connected to the r² finger. In this way the resistance Re' is not short circuited by its contactor until the r² finger is energized, which occurs between the fourth and fifth positions of the controller. When this switch is in thrown position, the sequence of operations is as follows: At the first position contactor A closes; G also closes, but its circuit is open at the second blade of the cut-out switch. At the second position the r' finger is energized, but the control wire from this finger is open. At the third position contactor F closes. This gives a power circuit from trolley through Re′ resistance and the number 3 and number 4 motors to ground. At the fourth position contactor D closes, but its power circuit is open. At the transition position (Tr) the $c$ finger is energized, but the wire to the contactor C is cut off by the third blade of the switch. At the fifth position, the $r^2$ finger energizes the wire to contactor R′, as well as contactor R$^2$, thus short circuiting the resistance and putting the two motors numbers 3 and 4 in series across the line to ground. At the sixth position, the $b$ finger energizes contactor C, putting number 4 motor across the line, and short circuiting the number 3 motor. At the seventh position contactor D closes and puts motor number 3 across the line in parallel with motor number 4.

To cut out the number 3 and number 4 motors, the first blade 74 of the switch COS′ opens the control wire of the $c$ finger to the C contactor. The second blade 75 opens the control wire to the $r′$ finger and connects the R′ contactor to the $r^2$ finger. The third blade 76 opens the power circuit between the number 4 motor and the D and G contactors. The sequence of operations at the different positions of the controller need not be traced out in detail as they are similar to those described in connection with the cutting out of the number 1 and number 2 motors. In this form of our invention it will be seen that there are only four wires of the power circuits carried through the cut-out switches, the other cutting out operations occurring wholly in the control circuits.

In Figs. 9, 10 and 11 we have illustrated another modification. In these figures the operations in passing from the series-parallel to the full-parallel position are substantially the same as in the previous forms. We have, however, in this form provided means whereby at least three of the motors may be kept actively in circuit at all times in passing from series to series parallel position. The power circuit is, in general, similar to that shown in the preceding figures, except for the fact that the external resistance Re′ is connected between the fourth motor and ground; and except that an additional contactor H is employed. The energizing coil of this contactor (not shown) is connected to contact finger $h$ of the master controller MC$^4$. This contactor comes into play at the third running position and also in the following transitory position to keep the number 3 motor connected in series with motors numbers 1 and 2. In the first intermediate transitory position following the third position motor number 4 is connected in parallel with the other three motors in series and it is in series with the resistance Re′. In the second transitory position the two motors 3 and 4 are in parallel with the motors 1 and 2, but are connected in series with the resistance Re′. At the fifth position this resistance is cut out, leaving the motors in series-parallel. In these figures we have also shown a transitory position intermediate positions 4 and 5 in which the resistance Re$^2$ is placed in series with the number 3 motor, number 4 motor having been short circuited. The succeeding motor combinations are the same as in the preceding figures.

In Fig. 12 we have shown, diagrammatically, a circuit and control arrangement for effecting the various motor combinations of Fig. 3 by a simple controller of the drum type, instead of by a master controller and a series of contactors controlled thereby. In this figure the motor circuits are connected directly to the contact fingers J, K, L, S, M, P, Q, N and V, which are adapted to engage the series of contacts carried by the drum. The circuits in the various positions of the drum can be readily traced from this diagram and need not be described in detail.

80 designates an insulating barrier on the drum interposed between the drum contacts which are connected to the trolley side of the circuits and the contacts which are connected to the ground side of the circuits.

81 is a cut-out switch having a movable contact member 82 carried by the shaft 83 of the controller drum. This switch is interposed in the circuit between the trolley and the drum, and is arranged, as will be readily seen from Fig. 13, to open and close the trolley circuit, respectively, before such circuit is opened or closed by the drum contacts. The circuit from trolley to the drum is preferably carried through a contactor 84 to coil 85 which is directly controlled by the switch 81.

It will be seen from the foregoing detailed description that our invention accomplishes the objects previously stated, and that it provides a simple and efficient method of control in which there is a minimum change in speed and load on the motors from one position to another, with a minimum use of resistance, thus permitting a very gradual speed acceleration in passing from series to the parallel positions. The number of contacts necessary to effect the various motor combinations is reduced to a minimum; destructive arcing at the contacts is prevented; the possibility of a direct short circuit around the motors is obviated, and the cutting out of either pair of motors is effected with a minimum disturbance of the power circuits.

We desire it understood that we do not limit ourselves to the particular form of contactors which have been shown and described, inasmuch as we may employ any suitable form of these devices capable of being controlled by a master controller; also that the construction and arrangement of the cut-out switches, as well as the type of such switches employed, may be changed, and that minor changes may be made in the general system of motor combinations effected, all within the scope of our broader claims.

In the foregoing description we have merely described the arrangement of the motors and their connections for a single car, but it will readily be understood by those familiar with the art that the same system could be used on a series of cars controlled by a master controller.

What we claim is:

1. In the control of sets of four electric motors, the steps which consist in starting with all the motors in series, subsequently connecting them in series-parallel groups, and then connecting the motors all in parallel by successively establishing as many different parallel current paths as there are motors, and while establishing such parallel paths, maintaining at least three of the motors actively in circuit; substantially as described.

2. In the control of four electric motors, the method of changing the motors from series-parallel relation to full-parallel relation, which consists in successively establishing as many different parallel current paths as there are motors, and while establishing such parallel paths maintaining at least three of the motors actively in circuit; substantially as described.

3. In the control of four electric motors, the method of changing the motors from series-parallel relation to full-parallel relation, which consists in successively connecting the motors one after another to receive the full line voltage, and maintaining at least three of the motors actively in circuit while so connecting them; substantially as described.

4. In the control of four electric motors, the method of changing the motors from series-parallel to full-parallel which consists in first cutting out one of the motors and leaving two of them in series and the third in parallel with the two which are in series, then re-connecting said motor in parallel with the motors so left, then cutting out one of the two motors in series and finally connecting the last named motor in parallel with the others; substantially as described.

5. In the control of four electric motors, the method of changing the motors from series-parallel to full parallel, which consists in cutting out one of the motors, leaving two of them in series and the third in parallel with the two in series, and connecting in resistance with said third motor, then removing said resistance and re-connecting the cut out motor in parallel with the motors so left, then cutting out one of the two motors which are in series and re-connecting it in parallel with the other motors; substantially as described.

6. In the control of four electric motors, the method of changing the motors from series to parallel, which consists in first connecting them in series-parallel groups and maintaining at least three of the motors actively in circuit at all times, while so connecting them, then connecting the motors all in parallel, and maintaining at least three of the motors actively in circuit while making this connection; substantially as described.

7. In the control of four electric motors, the method of changing the motors from series to series-parallel which consists in first cutting out one of the motors and re-connecting it in series with external resistance and in parallel with the other three motors, and then connecting one of the other three motors into the circuit in place of the resistance; substantially as described.

8. In the control of four electric motors, the method of changing the motors from series to parallel, which consists in first connecting them in series-parallel groups and finally connecting them all in parallel, while maintaining at least three of the motors actively in circuit at all times, and inserting external resistances of different values in the circuit at different times while effecting these changes; substantially as described.

9. In the control of electric motors, the method which consists in holding certain of the power circuits closed during the reverse movement of the controller to its off circuit position, and thereby maintain the motors in a closed local circuit while opening the power connections thereto; substantially as described.

10. In the control of electric motors, the method of preventing arcing at the control contacts, which consists in holding certain of the power circuits closed after they would be normally opened during the return movement of the controller; substantially as described.

11. In the control of four electric motors, the method of changing the motors from series to parallel, which consists in first connecting them in series-parallel groups and maintaining at least three of the motors actively in circuit at all times while so connecting them, then successively connecting the motors to receive the full line voltage, and maintaining at least three of the motors actively in circuit while making these connections; substantially as described.

12. In the control of four electric motors, the method of changing the motors from series to parallel, which consists in first cutting out one of the motors and re-connecting it in series with external resistance and parallel with the other three motors, then connecting one of the other three motors into the circuit in place of the resistance, and then successively connecting the motors to receive the full line voltage; substantially as described.

13. In the control of four electric motors, the method of changing the motors from series to parallel, which consists in first connecting them in series-parallel groups and finally connecting them all in parallel by successively connecting them one after another across the line, and maintaining at least three of the motors actively in circuit at all times, external resistances of different values being inserted in the circuit at different times while effecting these changes; substantially as described.

14. Apparatus for the control of electric motors, comprising contacts and circuit connections for first connecting all the motors in series, then connecting them in series-parallel, and finally all in parallel, said contacts and connections being arranged to maintain at least three of the motors actively in circuit while establishing such changes; substantially as described.

15. Apparatus for the control of electric motors, comprising contacts and circuit connections for first connecting all the motors in series, then connecting them in series-parallel, and finally all in parallel, said contacts and connections being arranged to maintain at least three of the motors actively in circuit while establishing the change from series to series-parallel; substantially as described.

16. Apparatus for the control of electric motors, comprising contacts and circuit connections for first connecting all the motors in series, then connecting them in series-parallel, and finally all in parallel, said contacts and connections being arranged to maintain at least three of the motors actively in circuit while establishing the change from series-parallel to parallel; substantially as described.

17. Apparatus for the control of electric motors, having contacts and circuit connections for shifting the motors from series-parallel relation to full-parallel relation, said contacts and connections acting to successively connect the motors one after another across the line, and to retain at least three of the motors actively in circuit while so connecting them; substantially as described.

18. Apparatus for the control of electric motors, comprising a plurality of contactors for controlling the power circuits, a master controller for controlling the operation of the contactors, and said master controller and contactors having means whereby certain of the contactors are held closed during the return stroke of the master controller to the off position after the circuits of such contactors are normally opened by the master controller; substantially as described.

19. Apparatus for the control of electric motors, comprising a plurality of contactors for controlling the power circuits of the motors, a master controller having contacts and circuit connections for controlling the operation of the contactors, said contactors having means whereby certain of them can only be closed when certain other contactors are open, and the controller and contactors also having means whereby certain of the contactors remain closed during the return movement of the master controller beyond the times at which their circuits would normally be opened by the master controller; substantially as described.

20. Apparatus for the control of electric motors, comprising a plurality of contactors for controlling the power circuits of the motors, a master controller for controlling the operation of the contactors, certain of said contactors having inter-connected circuits whereby they are maintained closed during the return stroke of the master controller beyond the times at which their normal circuits are opened by the master controller; substantially as described.

21. Apparatus for the control of electric motors, comprising a series of contactors for controlling the power circuits, a master controller and control circuits leading therefrom for controlling the operation of the contactors, and motor cut-out switches having at least a major portion of their circuit changing contacts located in the control circuits only; substantially as described.

22. In apparatus for the control of electric motors, a series of contactors for controlling the power circuits of the motors, a master controller and control circuits leading therefrom for controlling the operation of the said contactors, and motor cut-out switches, said cut-out switches being located entirely in the control circuits; substantially as described.

In testimony whereof, we have hereunto set our hands.

PEARL N. JONES.
JAMES W. WELSH.

Witnesses:
Jesse B. Heller,
H. M. Corwin.